United States Patent Office 3,461,123
Patented Aug. 12, 1969

3,461,123
1H-IMIDAZO[4,5-b]PYRAZIN-2-ONES AND PROCESSES FOR THEIR PREPARATION
James H. Jones, Blue Bell, and Edward J. Cragoe, Jr., Lansdale, Pa., assignors to Merck & Co., Inc., Rahway, N.J., a corporation of New Jersey
No Drawing. Filed Apr. 12, 1968, Ser. No. 721,065
Int. Cl. C07d 57/24; A61k 27/00
U.S. Cl. 260—250    9 Claims

ABSTRACT OF THE DISCLOSURE 1H-imidazo[4,5-b]pyrazin-2-ones are described which are substituted on the pyrazine ring with a mercapto or hydroxy group and the thio-ethers and ethers thereof and optionally substituted on one or more of the remaining available positions. These compounds are prepared principally by diazotization of a 3-aminopyrazinoic acid hydrazide, followed by heating of the intermediate acid azide. Certain of the substituted compounds are prepared by standard substitution reactions on the preformed 1H-imidazo[4,5-b]pyrazin-2-ones. The products have utility as antihypertensive agents with a moderate amount of diuretic and saluretic activity.

---

This invention relates to novel organic compounds and more specifically relates to novel 6(or 5)-hydroxy (and mercapto)-1H-imidazo[4,5-b]pyrazin-2-ones and the corresponding ethers and thio-ethers, and to process as for their preparation.

The 1H-imidazo[4,5-b]pyrazin-2-ones of this invention can be represented by the structural formula:

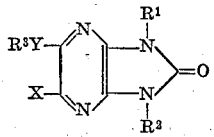

wherein $R^1$ represents (a) hydrogen,
(b) lower alkylcarbonyl of from 2 to about 6 carbon atoms, e.g., acetyl, propionyl, butyryl, pentanoyl, or hexanoyl, either straight or branched chain,
(c) cycloalkyl, preferably lower cycloalkyl of from 3 to about 7 carbon atoms, e.g., cyclopropyl, cyclopentyl, cyclohexyl, cycloheptyl and the like,
(d) alkenyl, preferably lower alkenyl of from 3 to about 5 carbon atoms, e.g., allyl, propenyl, and the like,
(e) lower alkoxycarbonyl, wherein the lower alkoxy moiety, has from 1 to about 3 carbons, e.g., methoxy, ethoxy, and propoxy,
(f) alkyl, preferably lower alkyl of from 1 to about 5 carbon atoms, such as methyl, ethyl, propyl, butyl, and pentyl, either straight or branched chain, and either unsubstituted or substituted, such as with
  (1) hydroxy,
  (2) heterocyclic group having 5 or 6 members, containing 1 or more hetero atoms selected from oxygen and/or nitrogen, e.g., morpholino, piperazino and the like,
  (3) lower alkoxycarbonyl, wherein the lower alkoxy group has from 1 to about 3 carbons, e.g., methoxy, ethoxy, and propoxy,
  (4) hydrazinocarbonyl, wherein the hydrazino group is either unsubstituted or substituted with such as lower alkyl of from 1 to about 3 carbons, e.g., methyl, ethyl, or propyl, on either $N^1$ and/or $N^2$ of the hydrazine,
  (5) lower alkoxy of from 1 to about 3 carbons, such as methoxy, ethoxy, propoxy and isopropoxy,
  (6) amino, either unsubstituted or mono- or di-substituted with, advantageously lower alkyl group(s) having from 1 to 5 carbons;

$R^2$ represents (a) hydrogen
(b) lower alkylcarbonyl of from 2 to about 6 carbon atoms, e.g., acetyl, propionyl, butyryl, pentanoyl, or hexanoyl, either straight or branched chain,
(c) cycloalkyl, preferably lower cycloalkyl of from 3 to about 7 carbon atoms, e.g., cyclopropyl, cyclopentyl, cyclohexyl, cycloheptyl and the like,
(d) lower alkoxycarbonyl, wherein the lower alkoxy moiety, has from 1 to about 3 carbons, e.g., methoxy, ethoxy and propoxy,
(e) alkyl, preferably lower alkyl of from 1 to about 5 carbon atoms, such as methyl, ethyl, propyl, butyl, and pentyl, either straight or branched chain, and either unsubstituted or substituted, such as with
  (1) heterocyclic group having 5 or 6 members, containing 1 or more hetero atoms selected from oxygen and/or nitrogen, e.g., morpholino, piperazino and the like,
  (2) lower alkoxycarbonyl, wherein the lower alkoxy group has from 1 to about 3 carbons, e.g., methoxy, ethoxy, and propoxy,
  (3) hydrazinocarbonyl, wherein the hydrazino group is either unsubstituted or substituted with such as lower alkyl of from 1 to about 3 carbons, e.g., methyl, ethyl, or propyl, on either $N^1$ and/or $N^2$ of the hydrazine;

$R^3$ represents (a) hydrogen,
(b) lower alkenyl of from 3 to about 5 carbons such as allyl, propenyl or the like,
(c) lower cycloalkyl of from 3 to about 8 carbon atoms such as cyclopropyl, cyclopentyl, cyclohexyl, cycloheptyl, and cyclooctyl,
(d) lower alkyl of from 1 to about 5 carbon atoms either straight or branched chain, either unsubstituted or substituted with such as
  (1) hydroxy,
  (2) lower alkoxy of from 1 to about 3 carbon atoms such as methoxy, ethoxy, propoxy and isopropoxy,
  (3) mononuclear aryl, especially phenyl,
  (4) mononuclear aroyl, especially benzoyl,
  (5) cyano,
  (6) lower alkoxycarbonyl such as methoxycarbonyl, ethoxycarbonyl, or the like,
  (7) heterocyclic, such as 2-imidazolin-2-yl-, pyridyl and the like;

X represents (a) hydrogen, and
(b) halo, especially chloro and bromo;

Y represents (a) oxygen, and
(b) sulfur,

The 1H-imidazo[4,5-b]pyrazin-2-ones of this invention are orally active, relatively nontoxic, highly effective antihypertensive agents with a moderate amount of diuretic and saluretic activity, lowering the blood pressure of rats when administered intraperitoneally and of dogs when administered intravenously at doses of 20–40 mg./kg. The antihypertensive effect persists for up to several hours depending on dose with no signs of toxicity.

The products of this invention can be administered in in the form of pills, tablets, capsules, elixirs, injectable preparations and the like and can comprise one or more of the compounds of this invention as the only essential active ingredient of the pharmaceutical formulation, or, the novel compound(s) can be combined in pharmaceutical formulations with other therapeutic agents. The compounds of this invention are advantageously administered at a dosage range of from about 5 mg./day to about 750 mg./day or at a somewhat higher or lower dosage preferably in subdivided amounts on a 2 to 4 times a day regimen.

It is recognized that the novel compounds of this invention are tautomeric in nature:

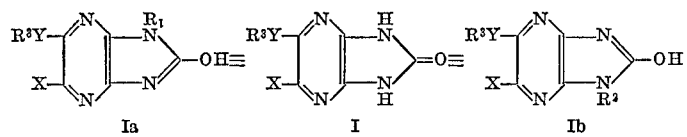

Such tautomerism is only possible wherein $R^1$ and/or $R^2$ is hydrogen. Although the 1H-imidazo[4,5-b]pyrazin-2-ol (Ia or Ib) might represent a significant or predominant form of a given compound, for the sake of conssitency Structure I has been selected for purposes of this specification and named accordingly as 1H-imidazo[4,5-b]pyrazin-2-one.

The novel compounds of this invention can be prepared by several routes. The most general method is illustrated below:

Method A

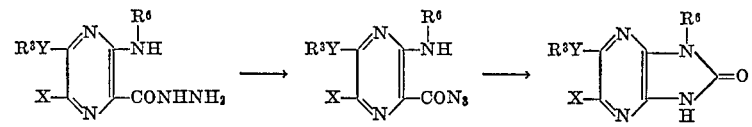

where $R^6$ represents hydrogen, lower alkyl, lower cycloalkyl, hydroxy-lower alkyl, lower(alkoxy-alkyl), lower alkenyl, and di(lower alkyl)amino-lower alkyl, wherein these groups have the scope defined for them in the definition of $R^1$.

In this case, a Curtius reaction or modification thereof is employed which involves diazotization of a 3-aminopyrazinoic acid hydrazide with an alkali metal nitrite in acid medium, which results in the formation of a pyrazinoic acid azide, which rearranges spontaneously when heated in a solvent to the required 1H-imidazo[4,5-b]pyrazin-2-one. The alkali metal nitrite, usually sodium or potassium nitrite in water is added slowly, preferably below the surface, to a stirred solution of the hydrazide in mineral acid, usually from about 0.5 N to 6 N hydrochloric acid, although sulfuric, hydrobromic or the like acid can be employed at a temperature from ambient to about steam bath temperature. The temperature employed is usually that required to dissolve the hydrazide. The intermediate acid azide precipitates from the reaction mixture, and because of its explosive nature is normally not purified or characterized, but simply collected by filtration, dried carefully and utilized in the next step.

The intermediate 3-aminopyrazinoic acid azide is dissolved in an alcoholic solvent such as methanol, ethanol, propanol, isopropanol, butanol or the like or for solubility reasons in a substituted alcohol such as 2-methoxyethanol, 2-ethoxyethanol or the like and heated on the steam bath for from 1 to 5 hours. Temperatures from about 50° C. to the reflux temperature of the solvent are satisfactory, the steam bath temperature being convenient. Similarly 1 to 5 hours is sufficient to complete the reaction, but longer periods such as overnight are not detrimental, if convenient. The product is isolated by evaporation of the solvent and recrystallization from a suitable solvent, or solvent mixtures.

In some cases, some of the substituents $R^1$ and $R^2$ can be incorporated into the molecule of the preformed 1H-imidazo[4,5-b]pyrazin-2-one and are designated as $R^7$, wherein $R^7$ represents lower alkyl, lower alkoxycarbonyl-lower alkyl, lower alkoxycarbonyl, lower alkylcarbonyl, lower cycloalkyl, di(lower alkyl)amino-lower alkyl, and heterocyclic-lower alkyl such as morpholino-lower alkyl and piperazino-lower alkyl, wherein these groups have the scope defined for them in the definition of $R^2$. For example, if one or both imidazole nitrogens are unsubstituted, it, or they, can be acylated simply by refluxing the 1H-imidazo-[4,5-b]pyrazin-2-one in an acid anhydride such as acetic anhydride, propionic anhydride or the like for 1 to 10 hours, preferably about 3 hours, followed by evaporation of the excess anhydride and recrystallization to provide a 1-(or 3-) or (1,3-di)-acyl-1H-imidazo-[4,5-b]pyrazin-2-one.

Also, the unsubstituted nitrogens of the imidazo moiety are alkylated readily by dissolving the 1H-imidazo-[4,5-b]pyrazin-2-one in an alkanol solution of an alkali metal alkoxide, and treating it with an excess of alkyl or cycloalkyl iodide or bromide such as methyl bromide or iodide or ethyl bromide or iodide or cyclopentyl bromide under reflux. Evaporation of the solvent yields a 1-(or 3-) or (1,3-di)-alkyl-1H-imidazo[4,5-b]pyrazine-2-one.

Similar alkylation is accomplished by the portion-wise addition of a dialkyl sulfate such as dimethyl sulfate to a solution of a 1H-imidazo[4,5-b]pyrazin-2-one in aqueous base such as sodium hydroxide or potassium hydroxide. The product, a 1-(or 3-) or (1-3-di)-alkyl-1H-imidazo[4,5-b]pyrazin-2-one separates during the reaction and is collected and recrystallized from a suitable solvent.

Acylating or alkylating agents such as alkyl chloroformates and alkyl α-bromoalkanoates when added to a solution of a 1H-imidazo[4,5-b]pyrazin-2-one and an organic base such as a trialkylamine in a solvent such as a dialkylformamide or dialkyl sulfoxide yields the desired 1H-imidazo[4,5-b]pyrazin-2-one having in the 1-, 3-, or 1,3-positions either alkoxycarbonyl groups such as ethoxycarbonyl or alkoxycarbonylalkyl groups such as ethoxycarbonylmethyl, respectively.

Treatment of esters of the latter type with hydrazine in an alkanol solution results in the formation of the corresponding hydrazides.

Another type of substitution on the 1, or 3, or the 1 and 3-nitrogens occurs upon stirring overnight at room temperature an aqueous solution of a 1H-imidazo[4,5-b]pyrazin-2-one with a secondary amine e.g., morpholine or piperidine, and formaldehyde. The 1-(or 3-) or (1,3-di)-aminomethyl derivative separates from the solution, is collected and recrystallized.

The above transformations are illustrated by the following reaction scheme:

Method B

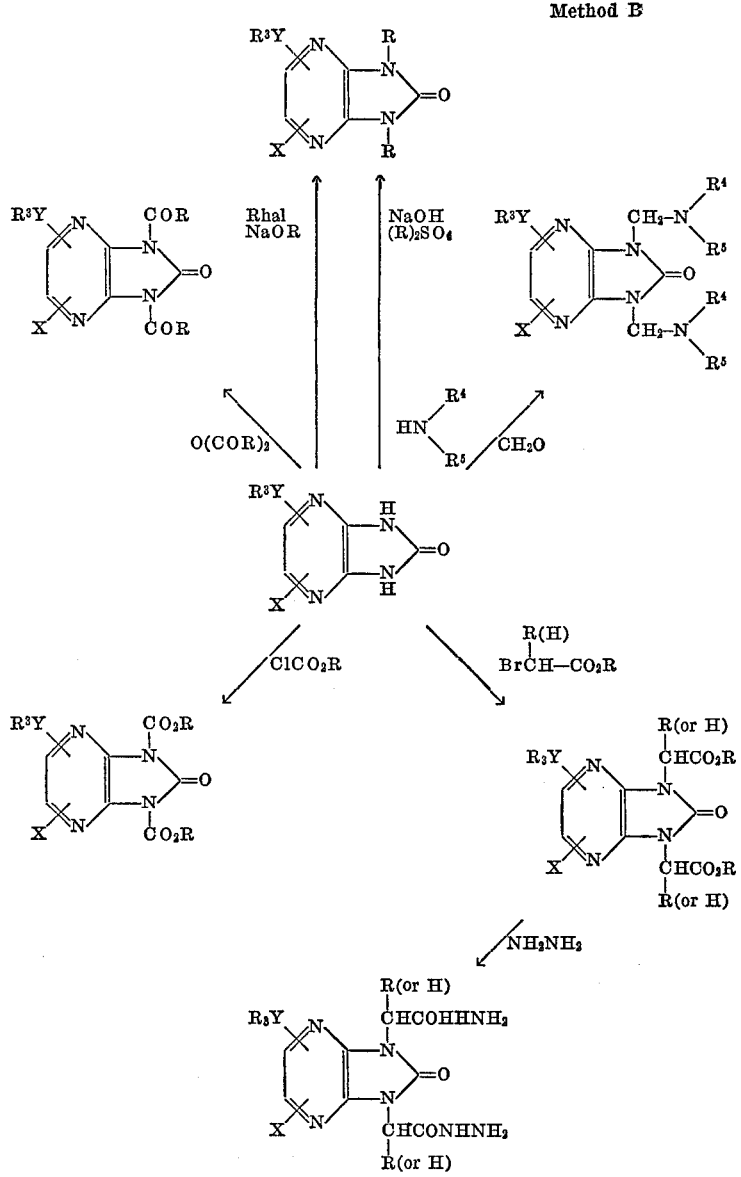

wherein hal represents iodide or bromide, R represents lower alkyl, and R⁴ and R⁵ represents lower alkyl of from 1 to 5 carbon atoms such as methyl, ethyl, propyl, butyl and pentyl, either straight or branched chain, or when taken together form a heterocyclic ring with the nitrogen to which they are attached such as morpholine, piperidine, piperazine, and the like. The above reaction schemes are intended as illustrative only, and although showing disubstitution in each case, it is understood that monosubstitution results if one of the imidazole nitrogens is previously substituted.

Although many of the 3-amino-5-R³Y-6-X-pyrazinoic acid hydrazides used as starting materials in this invention are known, those that are not known are readily available by synthesis from known compounds.

The intermediate esters are generally prepared by one or more of the processes shown below:

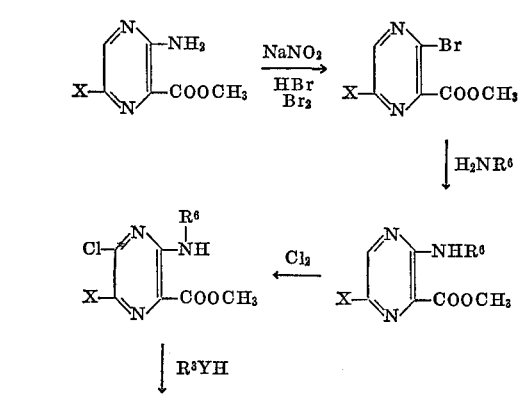

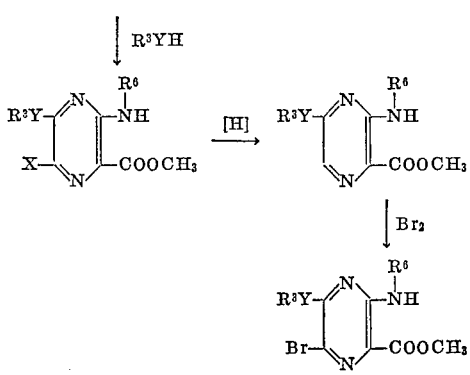

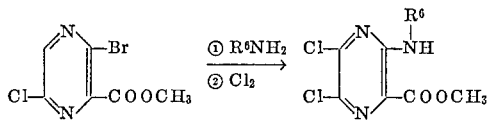

EXAMPLE 1.—METHYL 3-(2-DIMETHYLAMINO-ETHYLAMINO)-5,6-DICHLOROPYRAZINOATE

Step A: Preparation of methyl 3-(2-dimethylaminoethylamino)-6-chloropyrazinoate 2-dimethylaminoethylamine (3.5 g., 0.04 mole) is dissolved in ethanol (25 ml.) and methyl 3-bromo-6-chloropyrazinoate (5.0 g., 0.02 mole) is added with stirring. The solution is refluxed for 30 minutes, cooled and water (75 ml.) added slowly with stirring. The product that separates is removed by filtration and dried, yielding 1.7 g. (33%) of methyl 3 - (2 - dimethylaminoethylamino)-6-chloropyrazinoate, M.P. 105–108° C. This material is used in the next step without further purification.

Step B: Preparation of methyl 3-(2-dimethylaminoethylamino)-5,6-dichloropyrazinoate Methyl 3-(2-dimethylaminoethylamino)-6 - chloropyrazinoate (2.59 g., 0.01 mole) is slurried with 50 ml. of ethylene dichloride. The flask is flushed with nitrogen, then chlorine is bubbled through the slurry for 15 min. at 3 mmoles/min. After stirring at room temperature for 2½ hours, the methyl 3-(2-dimethylaminoethylamino)-5,6-dichloropyrazinoate is filtered off, and recrystallized from xylene.

Employing the procedure described in Example 1, Step A, but substituting for the dimethylaminoethylamine, used therein, an equivalent amount of an amine of formula $R^6NH_2$ followed in each case by chlorination as described in Step B, there is produced the methyl 3-$R^6NH_2$-5,6-dichloropyrazinoates described in Table I, according to Equation I.

TABLE I

| Example: | $R^6$ |
|---|---|
| 2 | —$CH_3$ |
| 3 | —$C_2H_5$ |
| 4 | —$CH_2CH_2OH$ |
| 5 | —⟨⟩ (cyclohexyl) |
| 6 | —⟨⟩ (cyclopentyl) |
| 7 | —$CH_2$—$CH$=$CH_2$ |
| 8 | —$CH_2CH_2OCH_3$ |

EXAMPLE 9.—METHYL 3-AMINO-5-METHYLTHIO-6-CHLOROPYRAZINOATE

A liter, round-bottom flask equipped with a stirrer, condenser and dropping funnel is charged with methyl 3-amino-5,6-dichloropyrazinoate (4.44 g., 0.02 mole) and anhydrous methanol (700 ml.). A solution of sodium methyl mercaptide, prepared from methyl mercaptan (1.92 g., 0.04 mole), in methanol (30 ml.) and 20% aqueous sodium hydroxide (4.2 ml., 0.021 mole), is added to the solution containing the ester over a ten minute period. The solution is refluxed for 15 minutes and cooled and the product that separates is removed by filtration and recrystallized from methanol, yielding 3.3 g. (71%) of methyl 3-amino-5-methyl-mercapto-6 - chloropyrazinoate, M.P. 212–214° C.

*Analysis.*—Calculated for $C_7H_8ClN_3O_2S$: C, 35.98; H, 3.45; N, 17.98. Found: C, 36.24; H, 3.33; N, 17.91.

By employing substantially the method described in Example 9, but substituting for the methyl mercaptan used therein, equal amounts of the $R^3$-mercaptan depicted in Table I, there is obtained the corresponding methyl 3-amino-$R^3S$-6-chloropyrazinoates also depicted in Table II, according to Equation II.

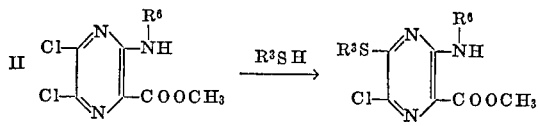

TABLE II

| Example: | Starting material from Example | $R^6$ | $R^3$ |
|---|---|---|---|
| 10 | (¹) | H | $C_2H_5$— |
| 11 | (¹) | H | n-$C_3H_7$— |
| 12 | (¹) | H | n-$C_5H_{11}$— |
| 13 | (¹) | H | HO($CH_2$)$_2$— |
| 14 | 1 | ($CH_3$)$_2$N($CH_2$)$_2$— | $CH_3O(CH_2)_2$— |
| 15 | 2 | $CH_3$— | ⟨⟩—$CH_2$— |
| 16 | 3 | $C_2H_5$— | ⟨⟩—$CH_2CH_2$— |
| 17 | 4 | HO($CH_2$)$_2$— | ⟨⟩— (cyclopentyl) |
| 18 | 5 | ⟨⟩— | ⟨⟩— |
| 19 | 6 | ⟨⟩— (cyclopentyl) | $CH_2$=$CH$—$CH_2$— |
| 20 | 7 | $CH_2$=$CH$—$CH_2$— | $CH_3$— |
| 21 | 8 | $CH_3O(CH_2)_2$— | $CH_3$— |

¹ Known.

EXAMPLE 22.—METHYL 3-AMINO-5-METHOXY-6-CHLOROPYRAZINOATE

Methyl 3-amino-5,6-dichloropyrazinoate (1.1 g., 0.005 mole) is dissolved in 200 ml. of boiling anhydrous methanol containing metallic sodium (115 mg. 0.005 g. atoms). The product which separates on cooling, is filtered, rinsed with water and methanol and dried to give 1.0 g. (92%) of methyl 3-amino-5-methoxy-6-chloropyrazinoate which when recrystallized from acetonitrile melts at 255–257° C.

*Analysis.*—Calculated for $C_7H_8ClN_3O_3$: C, 38.63; H, 3.71; N, 19.31. Found: C, 39.00; H, 3.82; N, 18.76.

Using the procedure described in Example 22, but substituting for the anhydrous methanol and the methyl 3-amino-5,6-dichloropyrazinoate used therein, equivalent amounts of an alcohol of formula $R^3OH$ and a methyl 3-$R^6$NH-5,6-dichloropyrazinoate respectively described in Table III, there are produced the methyl 3-$R^6$NH-5-$R^3$O-6-chloropyrazinoates also described in Table III, according to Equation III.

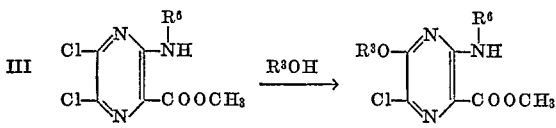

TABLE III

| Example | Starting material in Example | $R^6$ | $R^3$ |
|---|---|---|---|
| 23 | (¹) | H | $C_2H_5$— |
| 24 | (¹) | H | $CH_3O(CH_2)_2$— |
| 25 | (¹) | H | ⌬—$CH_2$— |
| 26 | 1 | $(CH_3)_2N(CH_2)_2$— | $CH_3$— |
| 27 | 2 | $CH_3$— | $C_2H_5$— |
| 28 | 3 | $C_2H_5$— | $CH_3O(CH_2)_2$— |
| 29 | 4 | $HO(CH_2)_2$— | ⌬—$CH_2$— |
| 30 | 5 | ⌬— | ⌬—$(CH_2)_2$— |
| 31 | 6 | ⬠ | ⬠ |
| 32 | 7 | $CH_2=CH-CH_2$— | ⌬— |
| 33 | 8 | $CH_3O(CH_2)_2$— | $CH_3$— |

¹ Known.

EXAMPLE 34.—METHYL 3-AMINO-5-METHOXY-PYRAZINOATE

A mixture of methyl 3-amino-5-methoxy-6-chloropyrazinoate from Example 22 (14.2 mole), 5% palladium on charcoal catalyst (9.0 g.), magnesium oxide (4.0 g.) and methanol (250 ml.) is shaken with hydrogen for 18 hours at ambient temperature and at an initial hydrogen pressure of 30 p.s.i. The mixture is filtered, and the solids extracted with a boiling solution of 2-propanol (500 ml.) and water (250 ml.). The methanol filtrate and the extract are combined and concentrated to a volume of 100 ml. The methyl 3-amino-5-methoxypyrazinoate which precipitates has M.P. 205.5–207.5° C.

*Analysis.*—Calculated for $C_7H_9N_3O_3$: C, 45.90; H, 4.95; N, 22.94. Found: C, 45.32; H, 4.78; N, 22.79.

Employing the procedure of Example 34, but substituting for the methyl 3-amino-5-methoxy-6-chloropyrazinoate used therein, equivalent amounts of the methyl 3-$R^6$NH-5-$R^3$O-6-chloropyrazinoates described in Table IV, there are produced the methyl 3-$R^6$NH-5-$R^3$O-pyrazinoates also described in Table IV, according to Equation IV.

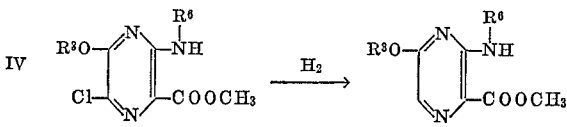

TABLE IV

| Example | Starting material in Example | $R^6$ | $R^3$ |
|---|---|---|---|
| 35 | 23 | H | $C_2H_5$— |
| 36 | 24 | H | $CH_3O(CH_2)_2$— |
| 37 | 26 | $(CH_3)_2N(CH_2)_2$— | $CH_3$— |
| 38 | 27 | $CH_3$— | $C_2H_5$— |
| 39 | 28 | $C_2H_5$— | $CH_3O(CH_2)_2$— |
| 40 | 30 | ⌬— | ⌬—$(CH_2)_2$— |
| 41 | 31 | ⬠ | ⬠ |
| 42 | 32 | $CH_2=CH-CH_2$— | ⌬— |
| 43 | 33 | $CH_3O(CH_2)_2$— | $CH_3$— |

EXAMPLE 44.—METHYL 3-AMINO-5-METHOXY-6-BROMOPYRAZINOATE

A solution of bromine (2.1 g., 0.013 mole) in acetic acid (10 ml.) is added to a suspension of methyl 3-amino-5-methoxypyrazinoate, from Example 34, (2.196 g., 0.012 mole) in acetic acid (25 ml.) at 50° C. After standing 10 minutes, the crystalline product is collected and recrystallized from 2-propanol, to give pure methyl 3-amino-5-methoxy-6-bromopyrazinoate.

Employing the method substantially as described in Example 44, but substituting for the methyl 3-amino-5-methoxypyrazinoate used therein, equivalent amounts of methyl 3-$R^6$NH-5-$R^3$O-pyrazinoates described in Table V, there are produced the methyl 3-$R^6$NH-5-$R^3$O-6-bromopyrazinoates also described in Table V, according to Equation V.

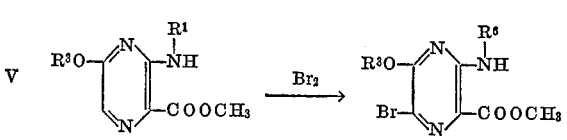

TABLE V

| Example | Starting material in Example | $R^6$ | $R^3$ |
|---|---|---|---|
| 45 | 35 | H | $C_2H_5$— |
| 46 | 36 | H | $CH_3O(CH_2)_2$— |
| 47 | 37 | $(CH_3)_2N(CH_2)_2$— | $CH_3$— |
| 48 | 38 | $CH_3$— | $C_2H_5$— |
| 49 | 39 | $C_2H_5$— | $CH_3O(CH_2)_2$— |
| 50 | 40 | ⌬— | ⌬—$(CH_2)_2$— |
| 51 | 41 | ⬠ | ⬠ |
| 52 | 43 | $CH_3O(CH_2)_2$— | $CH_3$— |

EXAMPLE 53.—3-AMINO-5-MERCAPTO-6-CHLORO-PYRAZINOIC ACID HYDRAZIDE

A solution of methyl 3-amino-5-mercapto-6-chloropyrazinoate (17 g.), and hydrazine (64% aqueous solution) (50 ml.) in water (100 ml.) is stirred at ambient temperature for 2.5 hours. After cooling in ice the precipitated solid is collected, dissolved in water (200 ml.) and acidified with acetic acid. The precipitated 3-amino- 5-mercapto-6-chloropyrazinoic acid hydrazide is collected and dried; M.P. 220° C. (dec.). After recrystallization from dimethylformamide it has M.P. 218–220° C. (dec.).

Following the procedure substantially as described in Example 53, but substituting for the methyl 3-amino-5-mercapto-6-chloropyrazinoate used therein, an equivalent amount of methyl 3-R⁶NH-5-R³S-6-X-pyrazinoate described in Table VI, there are produced according to Equation VI, the 3-R⁶NH-5-R³S-6-X-pyrazinoic acid hydrazides also described in Table VI.

Step B: 3-amino-6-chloro-5-methoxypyrazinoic acid hydrazide 3-amino-6-chloro-5-methoxypyrazinoic acid (2.0 g., 0.01 mole) is added to a stirred solution of dimethyl formamide (20 ml.) and triethylamine (2.5 g., 0.025 mole). To this solution is added N-t.-butyl-5-methyl-isoxazolium perchlorate (2.39 g., 0.01 mole) and stirring is continued for 24 hours at room temperature. The reaction is then poured into water (100 ml.) and the solid that separates is recrystallized from butylchloride to yield 2.7 g. (79%) of ester melting at 155–156° C. This ester

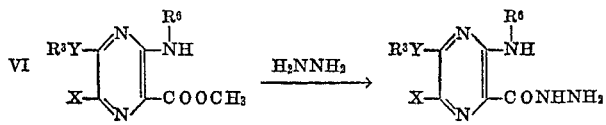

TABLE VI

| Example: | Starting material in Example | R⁶ | R³ | Y | X |
|---|---|---|---|---|---|
| 54 | 9 | H | CH₃— | S | Cl |
| 55 | 10 | H | C₂H₅— | S | Cl |
| 56 | 11 | H | n—C₃H₇— | S | Cl |
| 57 | 12 | H | n—C₅H₁₁— | S | Cl |
| 58 | 13 | H | HO(CH₂)₂— | S | Cl |
| 59 | 14 | (CH₃)₂N(CH₂)₂— | CH₃O(CH₂)₂— | S | Cl |
| 60 | 15 | CH₃ | ⟨phenyl⟩—CH₂— | S | Cl |
| 61 | 16 | C₂H₅— | ⟨phenyl⟩—(CH₂)₂— | S | Cl |
| 62 | 17 | HO(CH₂)₂— | ⟨cyclopentyl⟩ | S | Cl |
| 63 | 18 | ⟨cyclohexyl⟩ | ⟨cyclohexyl⟩ | S | Cl |
| 64 | 19 | ⟨cyclopentyl⟩ | CH₂=CH—CH₂— | S | Cl |
| 65 | 20 | CH₂=CH—CH₂— | CH₃— | S | Cl |
| 66 | 21 | CH₃O(CH₂)₂— | CH₃— | S | Cl |

EXAMPLE 67.—3-AMINO-5-METHOXY-6-CHLOROPYRAZINOIC ACID HYDRAZIDE

Step A: 3-amino-6-chloro-5-methoxypyrazinoic acid

To a boiling solution of potassium hydroxide (1.1 g., 0.02 mole) in water (200 ml.) is added methyl 3-amino-6-chloro-5-methoxypyrazinoate (4.3 g., 0.02 mole) (from Example 22) and the reaction is boiled for 10 minutes longer then cooled and acidified with dilute hydrochloric acid. The solid that separates is filtered, dried, and recrystallized from ethanol to yield 3.0 g. (75%) of product melting 222–224° C. (dec.).

Analysis.—Calculated for C₆H₆N₃O₃Cl: C, 35.39; H, 2.97; N, 20.64. Found: C, 35.60; H, 2.90; N, 20.46.

is dissolved in tetrahydrofuran at room temperature and excess 64% hydrazine is added dropwise. The white solid that separates is recovered by filtration and recrystallized from acetonitrile to yield 0.8 g. (37%) of product melting at 228–230° C. (dec.).

Analysis.—Calculated for C₆H₈N₅O₂Cl: C, 33.11; H, 3.70; N, 32.18. Found: C, 33.45; H, 3.56; N, 31.92.

Following the procedure substantially as described in Example 67, but substituting for the methyl 3-amino-5-methoxy-6-chloropyrazinoate used therein, an equivalent amount of methyl 3-R⁶NH-5-R³O-6-X-pyrazinoate described in Table VII, there are produced according to Equation VII, the 3-R⁶NH-5-R³O-6-X pyrazinoic acid hydrazides also described in Table VII.

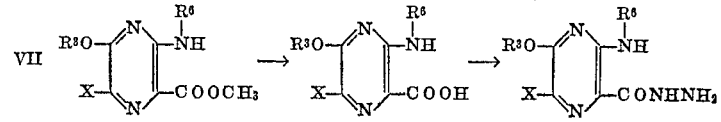

TABLE VII

| Example: | Starting material in Example | R⁶ | R³ | X |
|---|---|---|---|---|
| 68 | 23 | H | C₂H₅— | Cl |
| 69 | 24 | H | CH₃O(CH₂)₂— | Cl |
| 70 | 25 | H | ⟨phenyl⟩—CH₂— | Cl |
| 71 | 26 | (CH₃)₂N(CH₂)₂— | CH₃— | Cl |
| 72 | 27 | CH₃— | C₂H₅— | Cl |
| 73 | 28 | C₂H₅— | CH₃O(CH₂)₂— | Cl |

TABLE VII—Continued

| Starting material in Example | R⁶ | R³ | X |
|---|---|---|---|
| 74 | 29 HO(CH₂)₂— | 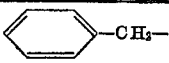—CH₂— | Cl |
| 75 | 30 — | 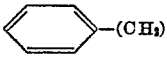—(CH₂)₂— | Cl |
| 76 | 31 — | 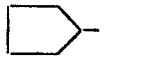— | Cl |
| 77 | 32 CH₂=CH—CH₂— | 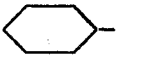— | Cl |
| 78 | 33 CH₃O(CH₂)₂— | CH₃— | Cl |
| 79 | 34 H | CH₃— | H |
| 80 | 35 H | C₂H₅— | H |
| 81 | 36 H | CH₃O(CH₂)₂— | H |
| 82 | 37 (CH₃)₂N(CH₂)₂— | CH₃— | H |
| 83 | 38 CH₃— | C₂H₅— | H |
| 84 | 39 C₂H₅— | CH₃O(CH₂)₂— | H |
| 85 | 40 — | 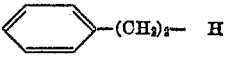—(CH₂)₂— | H |
| 86 | 41 — | — | H |
| 87 | 42 CH₂=CH—CH₂— | 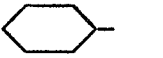— | H |
| 88 | 43 CH₃O(CH₂)₂— | CH₃— | H |
| 89 | 44 H | CH₃— | Br |
| 90 | 45 H | C₂H₅— | Br |
| 91 | 46 H | CH₃O(CH₂)₂— | Br |
| 92 | 47 (CH₃)₂N(CH₂)₂— | CH₃— | Br |
| 93 | 48 CH₃— | C₂H₅— | Br |
| 94 | 49 C₂H₅— | CH₃O(CH₂)₂— | Br |
| 95 | 50 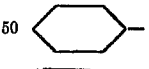— | 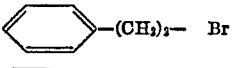—(CH₂)₂— | Br |
| 96 | 51 — | — | Br |
| 97 | 52 CH₃O(CH₂)₂— | CH₃— | Br |
| 98 | Known H | H | Cl |

EXAMPLE 99.—3-AMINO - 5 - ETHOXYCARBONYL-METHYLTHIO - 6 - CHLOROPYRAZINOIC ACID HYDRAZIDE

To a stirred solution of 3-amino-5-mercapto-6-chloropyrazinoic acid hydrazide (2.1 g., 0.01 mole) (from Example 53) in 50% aqueous ethanol, containing 5% sodium hydroxide (10 ml.), is added ethyl bromoacetate (1.67 g., 0.01 mole). After stirring for 1.5 hours, the solid that separates is isolated and dried to yield 2.3 g. (76%) of 3-amino-5-ethoxycarbonylmethylthio - 6 - chloropyrazinoic acid hydrazide, M.P. 150–153° C.

Analysis.—Calcd. for C₉H₁₂ClN₅O₃S: C, 35.35; H, 3.96; N, 22.91. Found: C, 35.82; H, 4.01; N, 23.30.

Employing the method substantially as described in Example 99, but substituting for the ethyl bromoacetate utilized therein, equivalent amounts of (a) 2-chloromethyl imidazoline
(b) phenacylbromide, and
(c) cyanomethyl bromide;

there is produced (a) 3 - amino-5-[(2-imidazolin-2-yl)methylthio]-6-chloropyrazinoic acid hydrazide, M.P. 198–200° C.
(b) 3 - amino-5-phenacylthio-6-chloropyrazinoic acid hydrazide, M.P. 195–197° C., and
(c) 3 - amino-5-cyanomethylthio-6-chloropyrazinoic acid hydrazide, M.P. 248–250° C.

EXAMPLE 100.—5-CHLORO-6-MERCAPTO-1H-IMIDAZO[4,5-b]prazin-2-one

3 - amino-5-mercapto-6-chloropyrazinoic acid hydrazide (from Example 53) (10.9 g., 0.05 mole) is dissolved in a warm mixture of water (250 ml.) and 6 N hydrochloric acid (10 ml.). At about 45° C. a solution of sodium nitrite (3.46 g., 0.05 mole) in water (20 ml.) is added dropwise with stirring, during which addition, a solid separates from the solution. The solid is collected, washed with water and dried. The dry solid is suspended in methyl Cellosolve (100 ml.) and heated on the steam bath for 2.5 hours with stirring. The solvent then is evaporated in vacuo, the residue is slurried with water, collected and dried, to give 5.8 g. (58%) with M.P.>290° C., of 5-chloro-6-mercapto-1H-imidazo[4,5-b]pyrazin-2-one.

Employing the method substantially as described in Example 100, but substituting for the 3-amino-5-mercapto-6-chloropyrazinoic acid hydrazide used therein, equivalent amounts of 3-R⁶NH-5-R³Y-6-X-pyrazinoic acid hydrazides described in Table VIII, there are produced the 5-X-6-R³Y-1H-imidazo[4,5 - b]pyrazin - 2 - ones also described in Table VIII, according to Equation VIII.

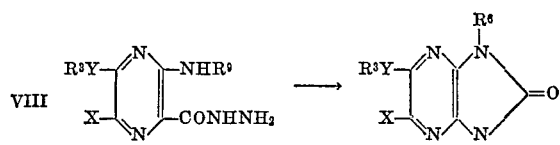

TABLE VIII

| Example: | Starting material in Example | R⁶ | R³ | Y | X |
|---|---|---|---|---|---|
| 101 | 54 | H | $CH_3-$ | S | Cl |
| 102 | 55 | H | $C_2H_5-$ | S | Cl |
| 103 | 56 | H | $n-C_3H_7-$ | S | Cl |
| 104 | 57 | H | $n-C_5H_{11}-$ | S | Cl |
| 105 | 58 | H | $HO(CH_2)_2-$ | S | Cl |
| 106 | 59 | $(CH_3)_2N(CH_2)_2-$ | $CH_3O(CH_2)_2-$ | S | Cl |
| 107 | 60 | $CH_3-$ | phenyl-$CH_2-$ | S | Cl |
| 108 | 61 | $C_2H_5-$ | phenyl-$(CH_2)_2-$ | S | Cl |
| 109 | 62 | $HO(CH_2)_2-$ | cyclopentyl- | S | Cl |
| 110 | 63 | phenyl- | phenyl- | S | Cl |
| 111 | 64 | cyclopentyl- | $CH_2=CH-CH_2-$ | S | Cl |
| 112 | 65 | $CH_2=CH-CH_2-$ | $CH_3-$ | S | Cl |
| 113 | 66 | $CH_3O(CH_2)_2-$ | $CH_3-$ | S | Cl |
| 114 | 67 | H | $CH_3-$ | O | Cl |
| 115 | 68 | H | $C_2H_5-$ | O | Cl |
| 116 | 69 | H | $CH_3O(CH_2)_2-$ | O | Cl |
| 117 | 70 | H | phenyl-$CH_2-$ | O | Cl |
| 118 | 71 | $(CH_3)_2N(CH_2)_2-$ | $CH_3-$ | O | Cl |
| 119 | 72 | $CH_3$ | $C_2H_5-$ | O | Cl |
| 120 | 73 | $C_2H_5$ | $CH_3O(CH_2)_2-$ | O | Cl |
| 121 | 74 | $HO(CH_2)_2-$ | phenyl-$CH_2-$ | O | Cl |
| 122 | 75 | phenyl- | phenyl-$(CH_2)_2-$ | O | Cl |
| 123 | 76 | cyclopentyl- | cyclopentyl- | O | Cl |
| 124 | 77 | $CH_2=CH-CH_2-$ | phenyl- | O | Cl |
| 125 | 78 | $CH_3O(CH_2)_2-$ | $CH_3-$ | O | Cl |
| 126 | 79 | H | $CH_3-$ | O | H |
| 127 | 80 | H | $C_2H_5-$ | O | H |
| 128 | 81 | H | $CH_3O(CH_2)_2-$ | O | H |
| 129 | 82 | $(CH_3)_2N(CH_2)_2-$ | $CH_3-$ | O | H |
| 130 | 83 | $CH_3-$ | $C_2H_5-$ | O | H |
| 131 | 84 | $C_2H_5-$ | $CH_3O(CH_2)_2-$ | O | H |
| 132 | 85 | phenyl- | phenyl-$(CH_2)_2-$ | O | H |
| 133 | 86 | cyclopentyl- | cyclopentyl- | O | H |
| 134 | 87 | $CH_2=CH-CH_2-$ | phenyl- | O | H |
| 135 | 88 | $CH_3O(CH_2)_2-$ | $CH_3-$ | O | H |
| 136 | 89 | H | $CH_3-$ | O | Br |
| 137 | 90 | H | $C_2H_5-$ | O | Br |
| 138 | 91 | H | $CH_3O(CH_2)_2-$ | O | Br |
| 139 | 92 | $(CH_3)_2N(CH_2)_2-$ | $CH_3-$ | O | Br |
| 140 | 93 | $CH_3-$ | $C_2H_5-$ | O | Br |
| 141 | 94 | $C_2H_5-$ | $CH_3O(CH_2)_2-$ | O | Br |

TABLE VIII

| Starting material in Example | R³ | R⁴ | Y | X |
|---|---|---|---|---|
| 142 | 95 | cyclohexyl- | phenyl-(CH₂)₂— | O | Br |
| 143 | 96 | cyclopentyl- | cyclopentyl- | O | Br |
| 144 | 97 | CH₃O(CH₂)₂— | CH₃— | O | Br |
| 145 | 98 | H | H | O | Cl |
| 146 | 99 | H | C₂H₅OOC—CH₂— | S | Cl |
| 147 | 99 | H | (imidazol-yl)-CH₂— | S | Cl |
| 148 | 99 | H | phenyl-COCH₂— | S | Cl |
| 149 | 99 | H | NC—CH₂— | S | Cl |

EXAMPLE 150.—1,3 - BIS(ETHOXYCARBONYL)-5-CHLORO - 6 - METHYLMERCAPTO - 1H - IMIDAZO[4,5-b]PYRAZIN-2-ONE

Ethyl chloroformate (0.002 mole) is added to a stirred solution of 5 - chloro-6-methylmercapto-1H-imidazo[4,5-b]pyrazin-2-one (from Example 101) (0.001 mole), 25 ml. of dimethylformamide and 1.4 ml. of triethylamine. After stirring for 30 minutes at room temperature the separated solid is collected, dried, and recrystallized from acetonitrile to give 1,3-bis(ethoxycarbonyl)-5-chloro-6-methylmercapto-1H-imidazo[4,5-b]pyrazin-2-one.

EXAMPLE 151.—1,3 - DIACETYL-5-CHLORO-6-BENZYLOXY-1H-IMIDAZO[4,5-b]PYRAZIN-2-ONE

A solution of 5-chloro-6-benzyloxy-1H-imidazo[4,5-b]pyrazin-2-one (from Example 117) (0.01 mole) in 30 ml. of acetic anhydride is refluxed for 3 hours. The solvent is evaporated and the residue is recrystallized from acetonitrile to give 1,3-diacetyl-5-chloro-6-benzyloxy-1H-imidazo[4,5-b]pyrazin-2-one.

EXAMPLE 152.—1,3 - BIS(ETHOXYCARBONYLMETHYL) - 5 - CHLORO - 6 - METHOXY-1H-IMIDAZO[4,5-b]PYRAZIN-2-ONE

To a solution of 5-chloro-6-methoxy-1H-imidazo[4,5-b]pyrazin-2-one (from Example 127) (0.001 mole) in 5 ml. of dimethylformamide, 2.0 g. of triethylamine is added with stirring, followed by ethyl bromoacetate (0.002 mole), and the mixture is stirred for 20 hours. After pouring into water the precipitate is collected and recrystallized from cyclohexane to give 1,3-bis(ethoxycarbonylmethyl) - 5 - chloro-6-methoxy-1H-imidazo[4,5-b]pyrazin-2-one.

EXAMPLE 153.—1,3 - BIS(HYDRAZINOCARBONYLMETHYL) - 5 - CHLORO - 6-METHOXY-1H-IMIDAZO[4,5-b]PYRAZIN-2-ONE

A mixture of 1,3-bis(ethoxycarbonylmethyl)-5-chloro-6-methoxy-1H-imidazo[4,5-b]pyrazin-2-one (0.001 mole) (from Example 149), 2 ml. of 64% hydrazine and 50 ml. of ethanol is refluxed for two and one-half hours. The solid that separates on cooling is collected, dried and recrystallized from isopropanol to give 1,3-bis(hydrazinocarbonyl) - 5 - chloro-6-methoxy-1H-imidazo[4,5-b]pyrazin-2-one.

EXAMPLE 154.—1,3 - DIMETHYL - 5 - CHLORO-6-BENZYLTHIO - 1H - IMIDAZO[4,5-b]PYRAZIN-2-ONE

A solution of 1-methyl-5-chloro-6-benzylthio-1H-imidazo[4,5-b]pyrazin - 2 - one (from Example 107) (0.001 mole) in 30 ml. of water and 20 ml. of 5% sodium hydroxide is prepared, and to it is added portionwise 0.9 g. of dimethyl sulfate while stirring rapidly. The yellow solid that separates is filtered off and the filtrate is treated with more dimethyl sulfate in portions while more sodium hydroxide is added to keep the solution basic. A total of about 2 ml. of dimethyl sulfate is required. After the solid is collected it is recrystallized from cyclohexane to give 1,3 - dimethyl-5-chloro-6-benzylthio-1H-imidazo[4,5-b]pyrazin-2-one.

EXAMPLE 155.—1,3 - BIS(PIPERIDINOMETHYL)-6-(2 - METHOXYETHYLOXY) - 1H - IMIDAZO[4,5-b]PYRAZIN-2-ONE

A solution of 1.7 g. of 6-(2-methoxyethyloxy)-1H-imidazo[4,5-b]pyrazin-2-one (from Example 128) and 3 ml. of piperidine in 50 ml. of water is cooled in ice and treated with 2 ml. of 36% formaldehyde dropwise. After stirring overnight at room temperature the 1,3-bis(piperidinomethyl) - 6 - (2 - methoxyethyloxy)-1H-imidazo[4,5-b]pyrazin-2-one separates.

EXAMPLE 156.—1,3-DICYCLOHEXYL-5-CHLORO-6-CYCLOHEXYLTHIO - 1H - IMIDAZO[4,5-b]PYRAZIN-2-ONE 1-cyclohexyl-5-chloro - 6 - cyclohexylthio-1H-imidazo[4,5-b]pyrazin-2-one (from Example 110) (0.05 mole) is added to a solution of sodium (0.05 mole) in 100 ml. of methanol. Cyclohexyl bromide (0.05 mole) is then added and the mixture is refluxed for 3 hours. The solution is filtered, and the filtrate is concentrated to dryness. The residue is recrystallized from cyclohexane to give 1,3-dicyclohexyl - 5 - chloro - 6 - cyclohexylthio-1H-imidazo[4,5-b]pyrazin-2-one.

EXAMPLE 157.—1,3 - BIS(MORPHOLINOMETHYL)-5-BROMO-6-ETHOXY - 1H - IMIDAZO[4,5-b]PYRAZIN-2-ONE

A solution of 1.7 g. of 5-bromo-6-ethoxy-1H-imidazo[4,5-b]pyrazin-2-one (from Example 137) and 3 ml. of morpholine in 50 ml. of water is cooled in ice and treated with 2 ml. of 36% formaldehyde dropwise. After stirring overnight at room temperature, 1,3-bis(morpholinomethyl)-5-bromo-6-ethoxy - 1H - imidazo[4,5-b]pyrazin-2-one separates.

EXAMPLE 158.—DRY FILLED CAPSULE CONTAINING 50 MG. OF ACTIVE INGREDIENT PER CAPSULE

|  | Mg. |
|---|---|
| 5-chloro-6-mercapto - 1H - imidazo[4,5-b]pyrazin-2-one (from Example 100) | 50 |
| Lactose | 275 |
| Mixed powders | 325 |

Mix the 5-chloro-6-mercapto - 1H - imidazo[4,5-b]pyrazin-2-one (from Example 100), and lactose and reduce to a No. 60 mesh powder. Encapsulate, filling 325 mg. in each No. 2 capsule.

The above formulation employing more or less active ingredients or a combination of active ingredients can be employed to prepare capsules of the other novel compounds of this invention hereinbefore described.

What is claimed is:

1. A process for the preparation of a compound of structural formula

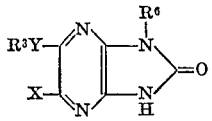

wherein $R^6$ is a member selected from the group consisting of
 (a) hydrogen,
 (b) lower alkyl,
 (c) lower cycloalkyl,
 (d) hydroxy-lower alkyl,
 (e) di(lower alkyl)amino-lower alkyl, and
 (f) lower(alkoxy-alkyl);

$R^3$ is a member selected from the group consisting of
 (a) hydrogen,
 (b) lower alkenyl,
 (c) lower cycloalkyl,
 (d) lower alkyl,
 (e) hydroxy-lower alkyl,
 (f) lower(alkoxy-alkyl),
 (g) phenyl-lower alkyl,
 (h) lower alkoxycarbonyl-lower alkyl,
 (i) benzoyl-lower alkyl,
 (j) cyano-lower alkyl, and
 (k) heterocyclic-lower alkyl, wherein the heterocycle is a 5 to 6 membered ring containing 1 to 2 nitrogens as the only hetero atoms and is linked to the lower alkyl through a nuclear carbon atom;

X is a member selected from the group consisting of
 (a) hydrogen, and
 (b) halo;

Y is a member selected from the group consisting of
 (a) oxygen, and
 (b) sulfur, which comprises the reaction of a compound of structural formula

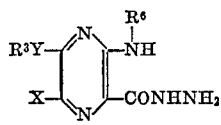

with alkali-metal nitrite solution in aqueous acid followed by heating of the resultant acid azide.

2. A compound of structural formula

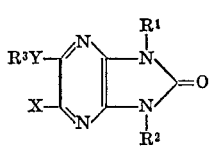

wherein $R^1$ is selected from the group consisting of
 (a) hydrogen,
 (b) lower alkylcarbonyl,
 (c) lower cycloalkyl,
 (d) lower alkenyl,
 (e) lower alkoxycarbonyl,
 (f) lower alkyl,
 (g) hydroxy-lower alkyl,
 (h) morpholino-lower alkyl,
 (i) piperazino-lower alkyl,
 (j) lower alkoxycarbonyl-lower alkyl,
 (k) hydrazinocarbonyl-lower alkyl,
 (l) lower(alkoxy-alkyl), and
 (m) di(lower alkyl)amino-lower alkyl;

$R^2$ is a member selected from the group consisting of
 (a) hydrogen,
 (b) lower alkylcarbonyl,
 (c) lower cycloalkyl,
 (d) lower alkoxycarbonyl,
 (e) lower alkyl,
 (f) morpholino-lower alkyl,
 (g) piperazino-lower alkyl,
 (h) lower alkoxycarbonyl-lower alkyl,
 (i) hydrazinocarbonyl-lower alkyl, and
 (j) di(lower alkyl)amino-lower alkyl;

$R^3$ is a member selected from the group consisting of
 (a) hydrogen,
 (b) lower alkenyl,
 (c) lower cycloalkyl,
 (d) lower alkyl,
 (e) hydroxy-lower alkyl,
 (f) lower(alkoxy-alkyl),
 (g) phenyl-lower alkyl,
 (h) lower alkoxy carbonyl-lower alkyl,
 (i) benzoyl-lower alkyl,
 (j) cyano-lower alkyl, and
 (k) heterocyclic-lower alkyl, wherein the heterocycle is a 5 to 6 membered ring containing 1 to 2 nitrogens as the only hetero atoms and is linked to the lower alkyl through a nuclear carbon atom;

X is a member selected from the group consisting of
 (a) hydrogen, and
 (b) halo;

Y is a member selected from the group consisting of
 (a) oxygen, and
 (b) sulfur.

3. A compound as claimed in claim 2, wherein $R^1$ and $R^2$ are both hydrogen, and $R^3$, X and Y have the meanings assigned to each of them in claim 2.

4. 5 - chloro - 6 - mercapto - 1H - imidazo[4,5 - b]pyrazin-2-one.

5. 5 - chloro - 6 - methylthio - 1H - imidazo[4,5 - b]pyrazin-2-one.

6. 5 - chloro - 6 - ethylthio - 1H - imidazo[4,5 - b]pyrazin-2-one.

7. 5 - chloro - 6 - hydroxy - 1H - imidazo[4,5 - b]pyrazin-2-one.

8. 5 - chloro - 6 - methoxy - 1H - imidazo[4,5 - b]pyrazin-2-one.

9. 5 - chloro - 6 - ethoxy - 1H - imidazo[4,5 - b]pyrazin-2-one.

No references cited.

NICHOLAS S. RIZZO, Primary Examiner

U.S. Cl. X.R.

260—247; 424—250

PO-1050
(5/69)

UNITED STATES PATENT OFFICE
CERTIFICATE OF CORRECTION

Patent No. 3,461,123          Dated August 12, 1969

Inventor(s) James H. Jones and Edward J. Cragoe, Jr.

It is certified that error appears in the above-identified patent and that said Letters Patent are hereby corrected as shown below:

Column 3, line 26, "conssitency" should read --consistency--. Column 5, in the formula between lines 45 and 55 that part of the formula reading

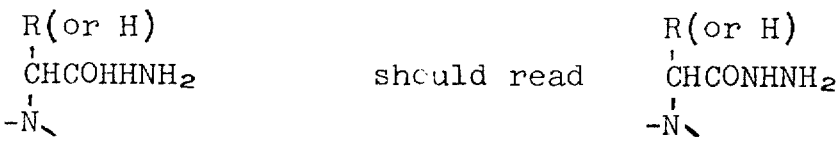

Column 9, Table III, Example 26, under the heading $R^6$ "$(CH_3)N(CH_2)_2$-" should read --$(CH_3)_2N(CH_2)_2$- --. Column 11, Table VI, in Examples 62, 63 and 64, under the heading Y and X, the values are S and Cl respectively. Column 15, that part of the formula in the upper left, reading

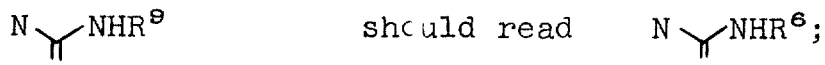

that part of the formula in the upper right, reading

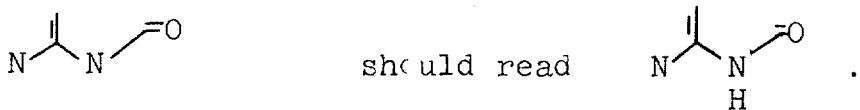

SIGNED AND
SEALED
MAY 19 1970

(SEAL)
Attest:

Edward M. Fletcher, Jr.
Attesting Officer

WILLIAM E. SCHUYLER, JR.
Commissioner of Patents